(12) United States Patent
Hung et al.

(10) Patent No.: US 7,575,479 B2
(45) Date of Patent: Aug. 18, 2009

(54) CARD CONNECTOR

(75) Inventors: Pei Chiao Hung, Tu-Cheng (TW); Mei Chuan Yang, Tu-Cheng (TW); Yun Chien Lee, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 11 days.

(21) Appl. No.: 11/979,288

(22) Filed: Nov. 1, 2007

(65) Prior Publication Data

US 2009/0117782 A1   May 7, 2009

(51) Int. Cl.
*H01R 24/00* (2006.01)
(52) U.S. Cl. ...................................... 439/630
(58) Field of Classification Search ................ 439/630, 439/64
See application file for complete search history.

(56) References Cited

U.S. PATENT DOCUMENTS 6,234,809 B1 * 5/2001 Futatsugi ..................... 439/64
6,736,671 B2 * 5/2004 Lee .......................... 439/541.5
7,438,599 B2 * 10/2008 Uchida et al. ............... 439/630
7,442,087 B2 * 10/2008 Long et al. .................. 439/630

* cited by examiner

*Primary Examiner*—Gary F. Paumen
(74) *Attorney, Agent, or Firm*—Rosenberg, Klein & Lee

(57) ABSTRACT

A card connector includes a first housing, a plurality of first terminals, a second housing and a plurality of second terminals. A plurality of accepting grooves are arranged in the first housing. An inserting groove is opened in the inner side of the accepting groove. The first terminals are accepted in the accepting grooves. A plurality of accepting holes are opened in the second housing. Each of the second terminals includes a welding portion and a base portion. The second terminal is arranged in the second housing. The welding portion projects out from the bottom of the second housing. The second housing is fixed on the bottom of the first housing. While the card connector is welded on a PCB, and the welding portion of the second terminal connects to the PCB, a space is formed between the card connector and the PCB.

3 Claims, 5 Drawing Sheets

CARD CONNECTOR

BACKGROUND OF THE INVENTION

1. Field of the Invention

This present invention relates to a connector, and more specifically to a card connector.

2. The Related Art

Conventional, a card connector connects a card to an electric device. The card connector includes a base and lots of terminals. A plurality of grooves are opened in the base for accepting the terminals. The terminal connects a card to a PCB, so the signal can be transmitted between the card and the PCB.

However, when the card connector is soldered to the PCB, a space between a base of the card connector and the PCB is very small. Therefore an area of the PCB under the card connector can not mount other elements, the PCB makes an incomplete use.

SUMMARY OF THE INVENTION

An object of the invention is to provide a card connector including a first housing, a plurality of first terminals, a second housing and a plurality of second terminals. A plurality of accepting grooves are arranged in the first housing, an inserting groove is opened in the inner side of the accepting groove. The first terminals are accepted in the accepting grooves. A plurality of accepting holes are opened in the second housing. The second terminal includes a welding portion and a base portion formed at the top of the welding portion. The second terminal is arranged in the second housing, the welding portion projects out from the bottom of the second housing. The second housing is fixed on the bottom of the first housing.

As above description, while the card connector is welded on a PCB, the welding portion of the second terminal connects to the PCB, so a space is formed between the card connector and the PCB, other elements can be arranged in the space.

BRIEF DESCRIPTION OF THE DRAWINGS

The invention, together with its objects and the advantages thereof may be best understood by reference to the following description taken in conjunction with the accompanying drawings, in which.

DETAILED DESCRIPTION OF THE PREFERRED EMBODIMENT

Figure 1:
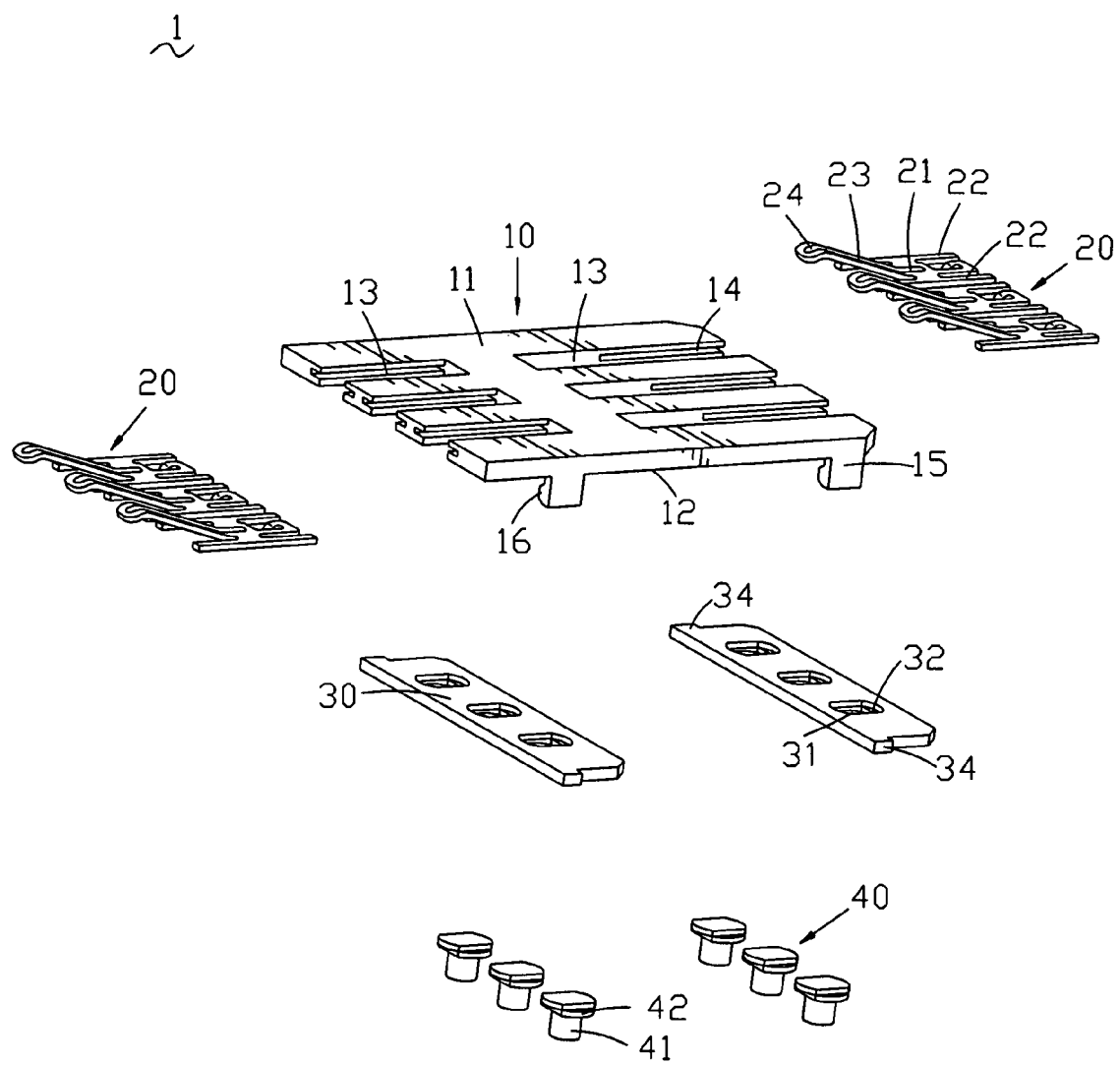
FIG. 1 is an exploded perspective view of a card connector according to the present invention.

First referring to FIG. 1, a card connector 1 according to the invention is shown. The card connector 1 includes a first housing 10, a plurality of first terminals 20, two second housings 30 and a plurality of second terminals 40.

Figure 2:
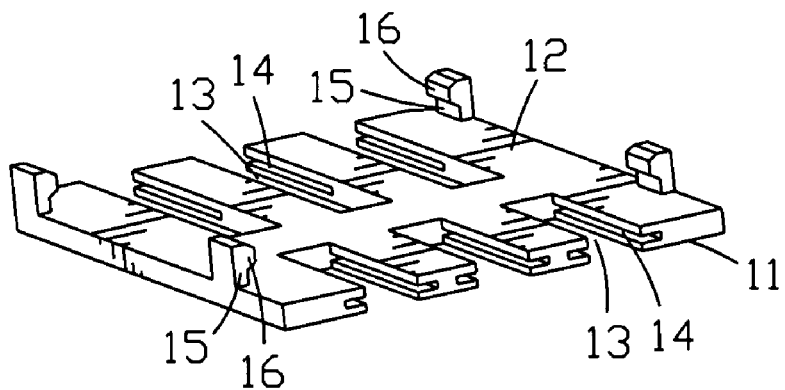
FIG. 2 is a perspective view of a first housing of the card connector.
Figure 3:
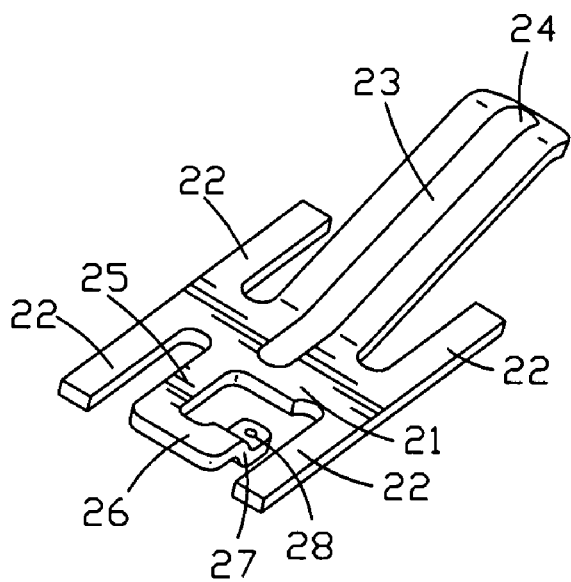
FIG. 3 is a perspective view of a first terminal of the card connector.

Referring to FIGS. 2 and 3, the first housing 10 shows a rectangular board shape. A plurality of accepting grooves 13 are opened in the first housing 10 and pass through a top surface 11 to a bottom surface 12 of the first housing 10. Two inserting grooves 14 are opened in the two sides of the accepting groove 13. The front and the rear of the bottom surface 12 respectively extend downward to form two extending portions 15 at two sides thereof. A projecting portion 16 extends inward from a lower portion of the inside of the extending portion 15.

Figure 4:
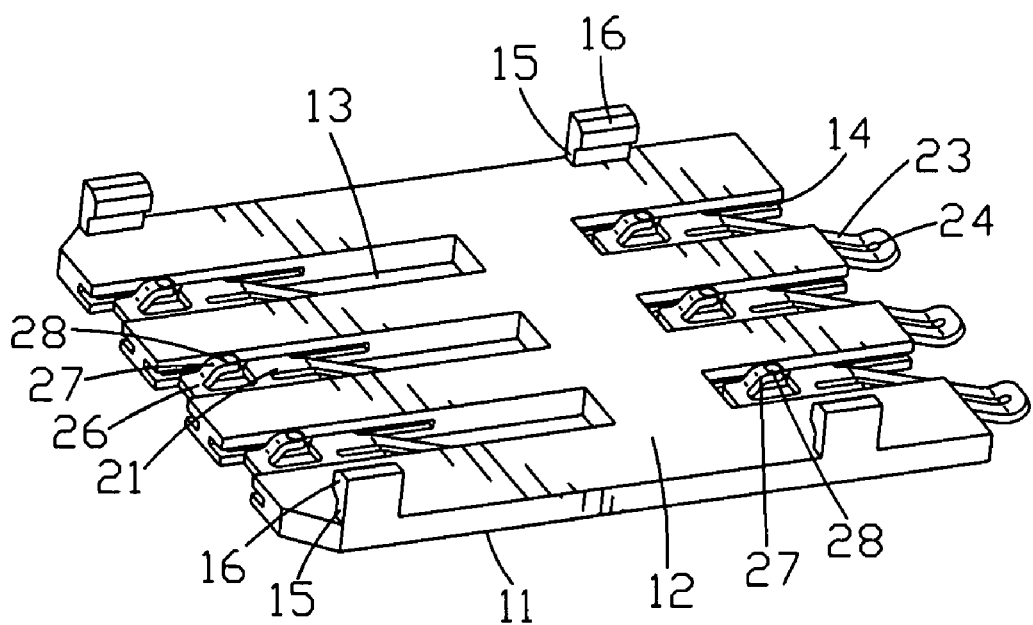
FIG. 4 is an assemble perspective view showing the first terminal in the first housing.

Please refer to FIGS. 1, 3 and 4, the first terminal 20 has a fixing portion 21 showing a rectangular board shape, four holding portions 22 extend longitudinally respectively from four corners of the fixing portion 21. The holding portions 22 are accepted in the corresponding inserting grooves 14 of the first housing 10. A first connecting portion 23 extends rearward from the rear of the fixing portion 21, and is located between the two holding portions 22 at rear. A rear end of the first connecting portion 23 bends downward to form a contacting portion 24. A second connecting portion 25 extends from the front of the fixing portion 21 and is located between the two holding portions 22 at front. A third connecting portion 26 extends towards one of the holding portions 22 from a free end of the second connecting portion 25. A bending portion 27 extends downward from a rear side of the third connecting portion 26. A conductive portion 28 extends rearward from the bottom of the bending portion 27 and is parallel with the fixing portion 21. When the first terminals 20 are assembled with the first housing 10, the fixing portion 21 is accepted in the accepting groove 13, the holding portions 22 are accepted in the inserting grooves 14, the first connecting portions 23 project out from the top surface 11, the conductive portion 28 projects out from the bottom surface 12.

Please refer to FIGS. 1 and 2 again, the second housing 30 shows a rectangular board shape. Two projections 34 are formed symmetrically in two ends of the second housing 30. Three accepting holes 31 are opened in the second housing 30. The accepting hole 31 defines a step 32. For the step 32, when the second terminal 40 is accepted in the accepting hole 31, the second terminal 40 will not drop out from the second housing 30.

Figure 5:
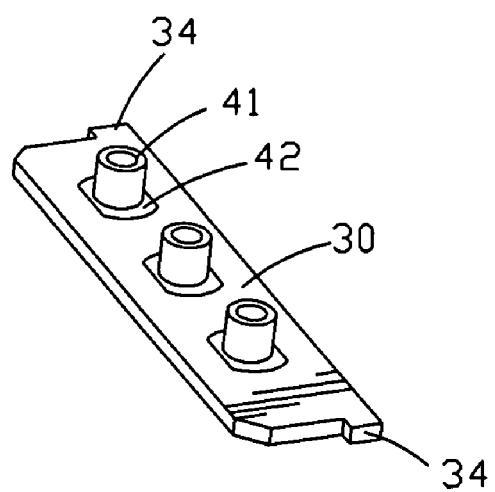
FIG. 5 is a perspective view of the assembly of a second terminal and a second housing.

Referring to FIGS. 1 and 5, the second terminal 40 has a welding portion 41 showing a column shape, and a base portion 42 formed at the top of the welding portion 41. The base portion 42 is accepted in the accepting hole 31 of the second housing 30 and against the step 32. The welding portion 41 projects out from the accepting hole 31 of the second housing 30.

Figure 6:
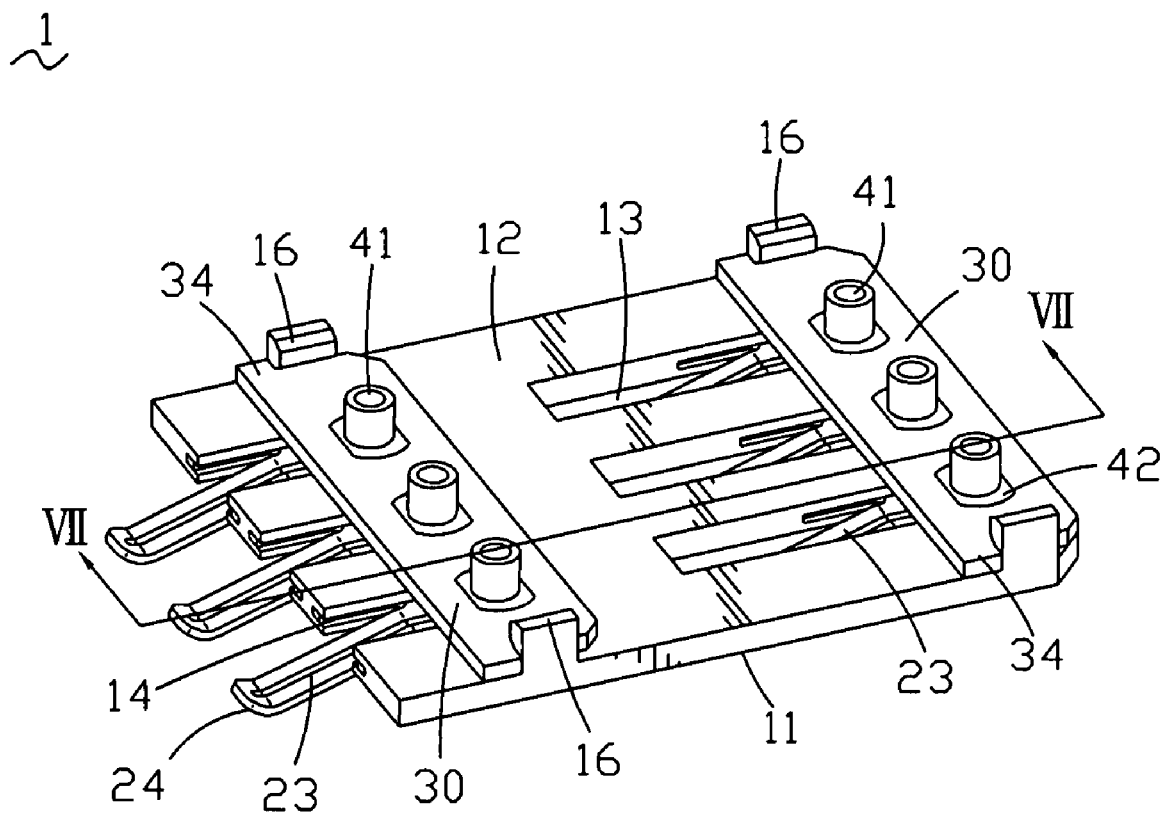
FIG. 6 is a perspective view of the card connector.
Figure 7:
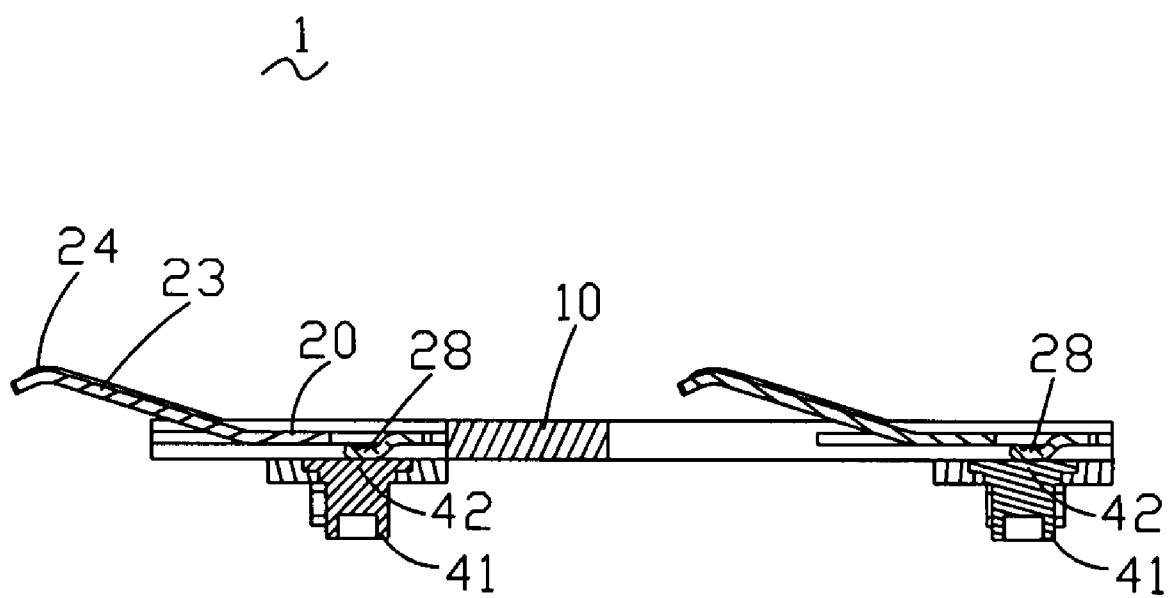
FIG. 7 is a cross-sectional view taken along line VII-VII of FIG. 6.

Referring to FIGS. 1, 6 and 7, in assembly, the first terminals 20 are assembled in the first housing 10, the second terminals 40 are received in the second housings 30. The second housings 30 are fixed on the bottom surface 12 of the first housing 10, the projecting portions 16 at front and at rear are respectively against the two ends of the corresponding second housings 30, and the corresponding projections 34 of the second housings 30 resist the extending portions 15. The conductive portion 28 is against the top of the base portion 42. When the card connector 1 is fastened on a PCB arranged in an electronic device, the welding portion 41 is welded on the PCB, and the contacting portions 24 of the first terminals 20 connect to a card accepted in the electric device.

For the second housings 30 and the second terminals 40 used in the present invention, a space is formed between the card connector 1 and the PCB, so other elements can be arranged under the card connector 1 and on the PCB.

An embodiment of the present invention has been discussed in detail. However, this embodiment is merely a specific example for clarifying the technical contents of the present invention and the present invention is not to be construed in a restricted sense as limited to this specific example, for example, the second housing also may be fixed on the bottom surface of the first housing by a plurality of bolts. Thus, the spirit and scope of the present invention are limited only by the appended claims.

What is claimed is:

1. A card connector, comprising:
a first housing, a plurality of accepting grooves opened in the first housing;
a plurality of first terminals accepted in the accepting grooves, having a contacting portion and a conductive portion;
a second housing fixed in the bottom of the first housing, a plurality of accepting holes opened in the second housing, each of the accepting holes defining a step; and
a plurality of second terminals corresponding to the first terminals, the second terminal having a base portion and a welding portion extending from the bottom of the base portion, the base portion accepted in the accepting hole of the second housing and against the step, the welding portion projecting out from the accepting hole, the conductive portion of the first terminal against the corresponding base portion of the second terminal;
wherein two sides of a bottom of the first housing respectively extend downward to form a plurality of extending portions, a projecting portion extends inward from a lower portion of the inside of the extending portion, the projecting portions are respectively disposed against two ends of the corresponding second housing and the corresponding projections of the second housing.

2. A card connector, comprising:
a first housing, a plurality of accepting grooves opened in the first housing;
a plurality of first terminals accepted in the accepting grooves, having a contacting portion and a conductive portion;
a second housing fixed in the bottom of the first housing, a plurality of accepting holes opened in the second housing, each of the accepting holes defining a step; and
a plurality of second terminals corresponding to the first terminals, the second terminal having a base portion and a welding portion extending from the bottom of the base portion, the base portion accepted in the accepting hole of the second housing and against the step, the welding portion projecting out from the accepting hole, the conductive portion of the first terminal against the corresponding base portion of the second terminal;
wherein the first terminal has a fixing portion, four holding portions extend longitudinally respectively from four corners of the fixing portion, a first connecting portion extends rearward from the rear of the fixing portion and is located between the two holding portions at rear, a rear end of the first connecting portion bends downward to form the contacting portion, a second connecting portion extends from the front of the fixing portion and is located between the two holding portions at front, a third connecting portion extends towards one of the holding portions from a free end of the second connecting portion, a bending portion extends downward from a rear side of the third connecting portion, the conductive portion extends rearward from the bottom of the bending portion and is parallel with the fixing portion.

3. The card connector as set forth in claim 2, wherein two sides of the accepting groove define two inserting grooves, the holding portion of the first terminal is accepted in the inserting groove.

* * * * *